J. W. BRUNDAGE.
SEPARABLE CORE.
APPLICATION FILED JUNE 29, 1920.

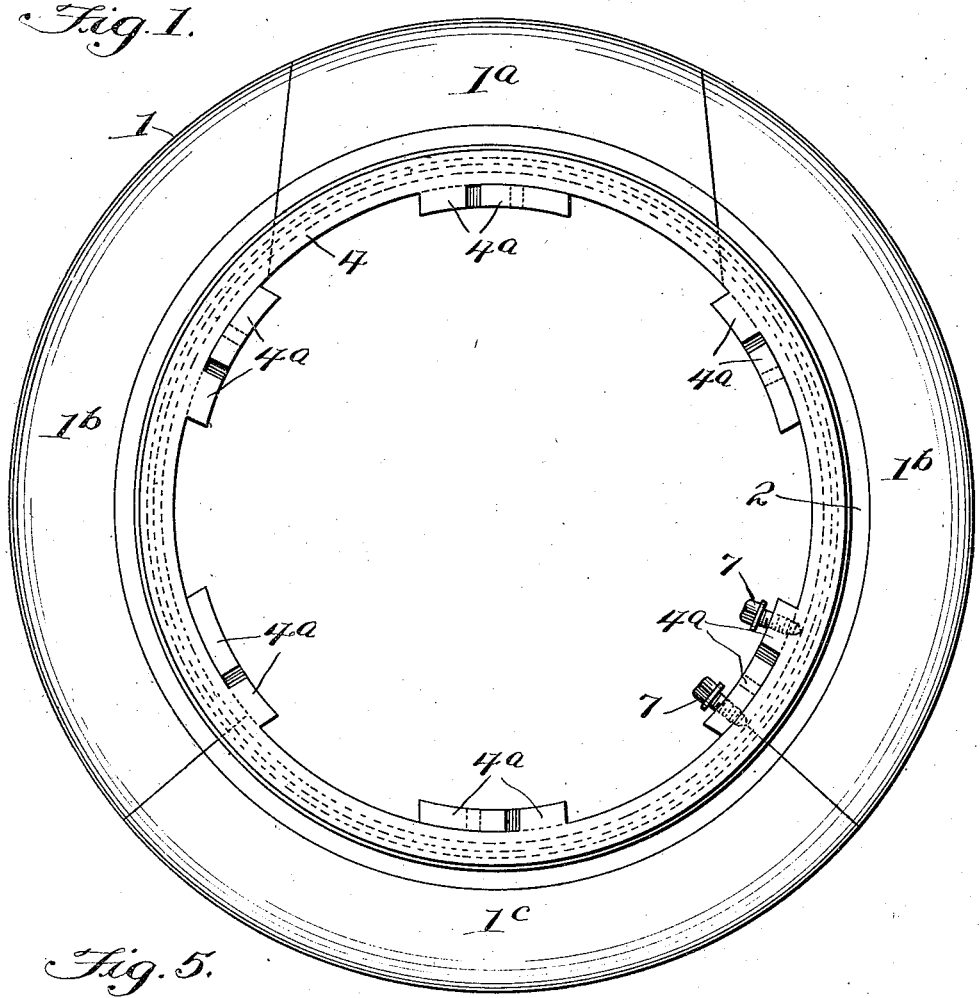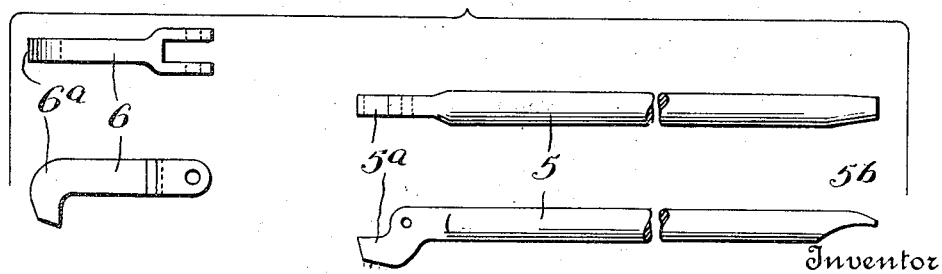

1,356,596.

Patented Oct. 26, 1920.
2 SHEETS—SHEET 2.

Inventor
James W. Brundage
By Spear Middleton Donaldson & Hull
Attorney

UNITED STATES PATENT OFFICE.

JAMES W. BRUNDAGE, OF AKRON, OHIO, ASSIGNOR TO THE MILLER RUBBER COMPANY, OF AKRON, OHIO, A CORPORATION OF OHIO.

SEPARABLE CORE.

1,356,596.  Specification of Letters Patent.  Patented Oct. 26, 1920.

Application filed June 29, 1920. Serial No. 392,654.

*To all whom it may concern:*

Be it known that I, JAMES W. BRUNDAGE, a citizen of the United States, and resident of Akron, Ohio, have invented certain new and useful Improvements in Separable Cores, of which the following is a specification.

My present invention relates to improvements in what are known as collapsible or separable cores or mandrels, such as are used for manufacturing the outer shoes or casings of pneumatic tires of the double tube type.

The invention aims to provide an extremely simple, economical and efficient type of core which may be easily manipulated to enable the segments to be separately withdrawn from the completed tire casing, and in which there will be complete absence of parts such as nuts or bolts which are removed in the separation of the core, and hence liable to be lost or misplaced.

The invention further aims to provide a construction, which, while capable of manipulation as aforesaid, will, in the assembled condition of the segments, hold the same firmly in accurate alinement under the stresses due to the winding of the tire fabric on the core and its manipulation in the vulcanizers, thereby insuring perfection in the finished tire.

With these and other objects in view, the invention includes the novel features of construction and arrangement and combination of parts hereinafter described and particularly defined in the appended claims.

An embodiment of my invention is illustrated in the accompanying drawings, in which:

Figure 1 is a side elevation of a core or mandrel constructed according to my invention;

Fig. 5 is a view of a tool suitable for effecting the locking and unlocking of the core.

Figure 2:
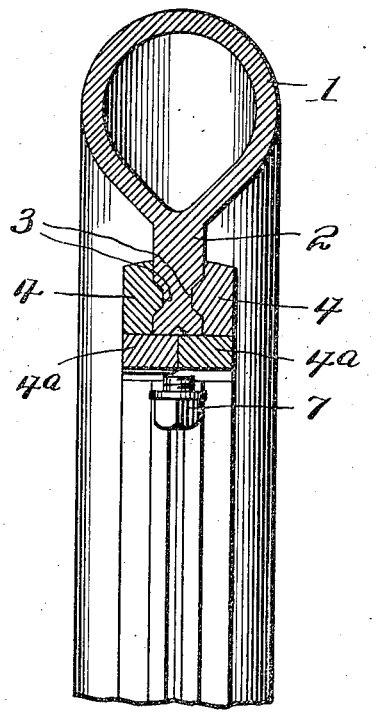
Fig. 2 is a transverse section on line 2—2 of Fig. 1.
Figure 3:
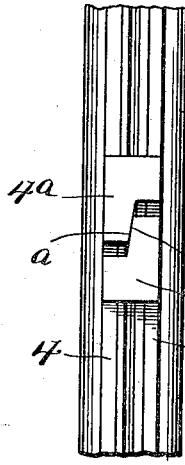
Figs. 3 and 4 are views of details.
Figure 4:
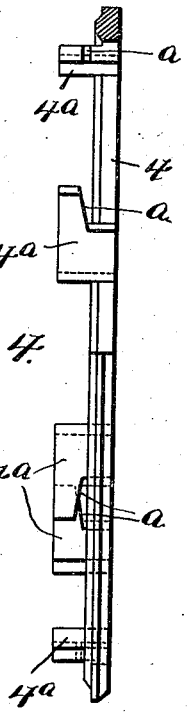
Figure 6:
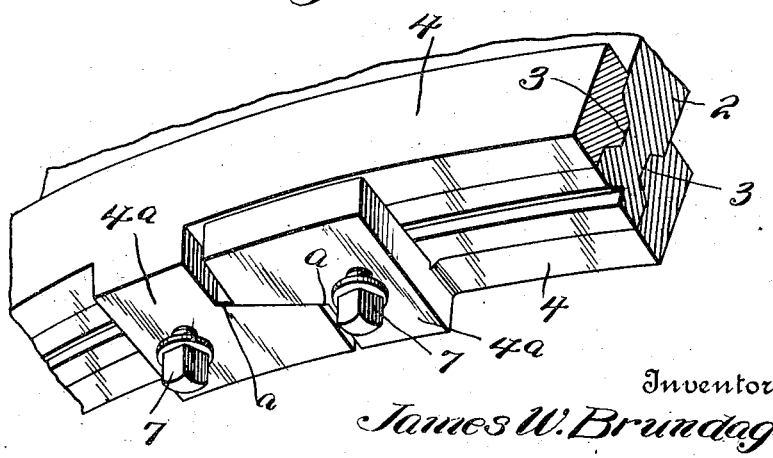
Fig. 6 is a fragmentary perspective view.

Referring by reference characters to these drawings, the numeral 1 indicates a core or mandrel which is of annular or ring-shaped form and is composed of a plurality of arc-shaped sections or segments. In the form illustrated in the drawing, I have shown the mandrel as composed of four segments as a convenient number, one of these members $1^a$ which constitutes the key piece being of tapered or wedge-shaped formation which enables it to be drawn inwardly and removed to unlock the remaining sections which may be thereafter removed from the tire piece by piece, as well understood by those skilled in the art. The lines of division between the side sections $1^b$ and the remaining opposite section $1^c$ may be on radial lines, as shown.

The core has a shape when viewed in cross-section, as shown in Fig. 2, which corresponds to the interior of the finished tire, and it is provided with an inwardly extending flange or web 2. This web is provided upon its opposite faces with annular grooves or channels 3, the walls of which are tapered or inclined as shown. For holding the core sections in alinement and abutting engagement, I provide a pair of rings 4 which are duplicates of each other and which are provided with annular wedge-shaped ribs adapted to engage the wedge-shaped or tapered grooves 3 as clearly shown in Fig. 2.

With the rings clamped in position as shown in Figs. 1 and 2, it will be seen that the core sections are firmly held in alinement and abutting engagement. To thus hold them in position in a manner to enable them to be readily removed, I provide each ring with a plurality of lugs $4^a$ each lug having a projecting portion provided with an inclined face $a$ designed to overlie the corresponding face of the lug of the opposite ring.

The rings are preferably exact duplicates of each other and hence interchangeable, and it will be seen that when they are in position on opposite sides of the assembled core sections or segments, the lugs lie within the inner surfaces of the web 2 of the core. When thus positioned, a circumferential movement of one ring relative to the other will cause the inclined faces $a$ to ride upon each other, thus drawing the rings toward each other and clamping the web 2 firmly therebetween. This clamping action forces the tapered ribs of the rings into the tapered grooves of the web, thus accurately alining the sections and holding them firmly in proper abutting position.

Any suitable means may be provided for manipulating the rings but a device which I have found desirable is shown in Fig. 5, consisting of a lever 5 having a dog or portion 5ª designed to abut against the heel of one lug, and a hook member 6 pivoted thereto and having a hook portion or dog 6ª designed to abut against the heel of the other adjacent or coöperating lug.

With said tool dogs in abutting position against the heels of a pair of adjoining lugs the swinging of the lever in the proper direction will force the lugs toward each other, effecting the circumferential shifting of the rings in opposite directions, thus securing the clamping action above described.

The opposite end of the lever 5 is shaped, as indicated at 5ᵇ, for entry between the adjacent lugs to enable them to be readily pried apart when the core is to be broken down or disassembled.

As an additional safeguard against loosening of the parts during the manipulation of the core and the winding of the fabric thereon, I may provide locking means such as set screws 7, 7 threaded through openings in two of the coöperating lugs 4ª in such position as to engage the inner edge of the corresponding core section and thus lock the rings against circumferential movement. The inner ends of the screws are preferably tapered, as shown.

Having thus described my invention, what I claim is:

1. A device of the character described comprising a plurality of arc-shaped sections adapted to abut against each other to form a separable core or mandrel, and a pair of locking rings adapted to overlie the inner portions of said sections, one of said rings having lugs or projections with inclined faces adapted to coact with lugs on the opposed ring for securing said rings together by a circumferential movement of one ring relative to the other.

2. A device of the character described comprising a plurality of arc-shaped sections adapted to abut against each other to form a separable core or mandrel, and a pair of locking rings adapted to overlie the inner portions of said sections, said rings having a plurality of lugs provided with inclined portions adapted to overlie the corresponding inclined portions of the lugs on the other ring.

3. A device of the character described comprising a plurality of arc-shaped sections adapted to abut against each other to form a separable core or mandrel, and a pair of of locking rings adapted to overlie the inner portions of said sections, each of said rings having a plurality of circumferentially disposed lugs adapted to abut against the inner face of the core sections, the lugs of one ring having portions with faces inclined to the plane of the core and adapted to coact with corresponding portions on the lugs of the other ring.

4. A device of the character described comprising a plurality of arc-shaped sections adapted to abut against each other to form a separable core or mandrel, and a pair of locking rings adapted to overlie the inner portions of said sections, one of said rings having lugs or projections with inclined faces adapted to coact with lugs on the opposed ring for securing said rings together by a circumferential movement of one ring relative to the other, and means for locking said rings against circumferential movement.

5. A device of the character described comprising a plurality of arc-shaped sections adapted to abut against each other to form a separable core or mandrel, and a pair of locking rings adapted to overlie the inner portions of said sections, said rings having a plurality of lugs provided with inclined portions adapted to overlie the corresponding inclined portions of the lugs on the other ring, and locking means carried by a pair of said lugs and adapted to engage the corresponding core section.

6. A device of the character described comprising a plurality of arc-shaped sections adapted to abut against each other to form a separable core or mandrel, and a pair of locking rings adapted to overlie the inner portions of said sections, said rings having a plurality of lugs provided with inclined portions adapted to overlie the corresponding inclined portions of the lugs on the other ring, and radially arranged locking set screws threaded through openings in a pair of the lugs and adapted to engage the corresponding core section.

In testimony whereof, I affix my signature.

JAMES W. BRUNDAGE.